Oct. 16, 1945.    F. R. BOEDECKER    2,387,005
TRASH BURNER
Filed Aug. 28, 1943

Inventor
Fred R. Boedecker
By
Attorney

Patented Oct. 16, 1945

2,387,005

UNITED STATES PATENT OFFICE 2,387,005

TRASH BURNER

Fred R. Boedecker, Tacoma, Wash., assignor of one-half to Robert F. Boedecker, Tacoma, Wash.

Application August 28, 1943, Serial No. 500,327

3 Claims. (Cl. 110—18)

This invention relates to structures for confining a trash-burning fire, and has special reference to such structures as may be used by towns, cities, military camps, picnic and amusement parks, and other establishments.

The objects of my invention are to provide a structure of such form as will completely and quickly burn any refuse, such as boxes, odd pieces of wood, paper, cloth, leaves and branches and any other inflammable refuse material, without emitting any cinders or sparks and, in so doing, generate a high degree of heat; second, to provide such a structure of brick or other suitable material thereby eliminating the necessity of using a large quantity of iron; third, to provide means for insulating the outer structure from the high heat developed in the inner structure; fourth, to provide means for bracing the inner dome by the outer structure; fifth, to provide means for forcing a large volume of air into the combustion chamber; sixth, to provide means for cooling the walls of the structure and then cooling the gases of combustion before they leave the structure; seventh, to provide means for feeding the trash into the center of the combustion chamber; and eighth, to provide a structure of simple construction, economic operation, and of great efficiency in use.

I attain these and other objects by the devices, mechanisms and arrangements illustrated in the accompanying drawing, in which—

Figure 1:
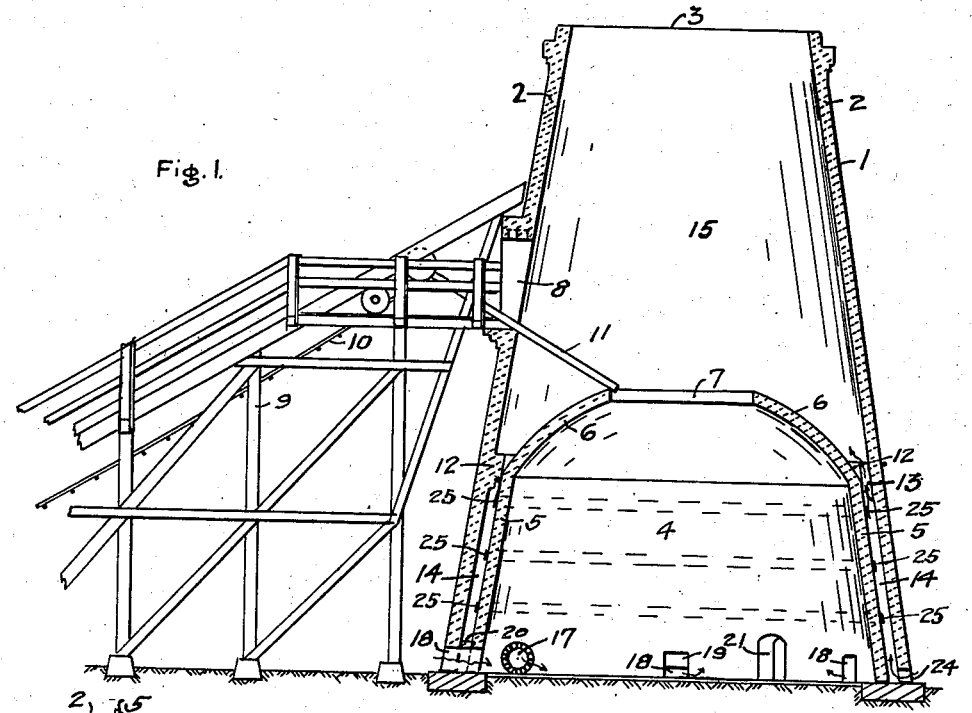
Figure 1:
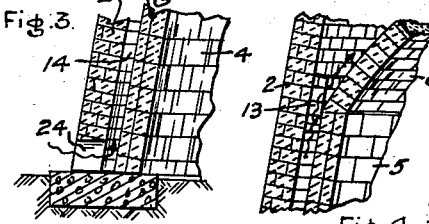
Figure 1:
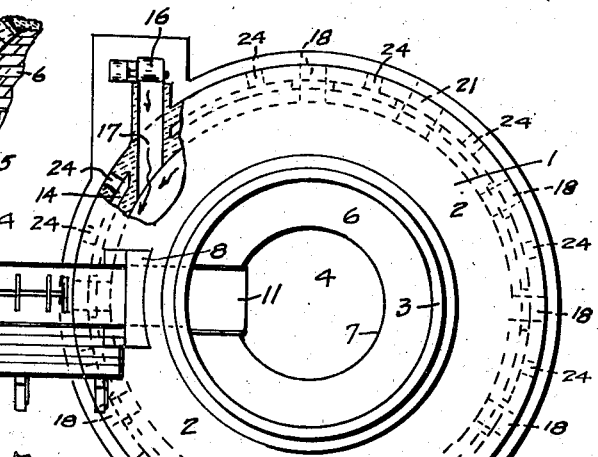
Figure 1:
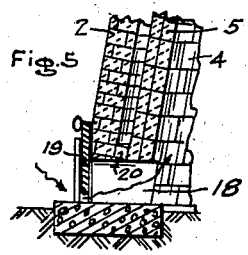
Figure 1:
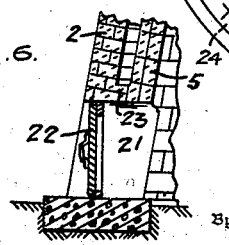

Fig. 1 is a vertical section of my improved trash burner, showing the trash feeding apparatus in elevation; Fig. 2 is a plan view thereof, a portion thereof being broken away to reveal the arrangement of the forced draft; Fig. 3 is a section thereof at one of the cooling air inlets; Fig. 4 is a section thereof showing the means for bracing the dome at one of the cooling air outlets; Fig. 5 is a section thereof at one of the auxiliary draft control inlets; and Fig. 6 is a section thereof at one of the clean-out doors.

Similar numerals of reference refer to similar parts throughout the several views.

The construction of this trash burner comprises an outer shell 1 (Fig. 1), having a conical wall 2 with a large central orifice 3, and being about three times the height of the combustion chamber enclosed therein; and an inner combustion chamber 4, having a conical wall 5, parallel with but separated from the said wall 2, and having a dome-shaped closure 6 with a central opening 7 somewhat smaller than the orifice 3 of the outer shell 1.

The particular form of the dome-shaped closure 6, as clearly seen in the drawing, may be described as a spherical segment having its height less than one-half its diameter. This form of dome, together with the supporting truncated conical wall 5 tends to reflect the heat of the fire in the combustion chamber back on to the fire, thus increasing the intensity of the heat.

The wall 2 of the outer shell 1 is provided with a trash feed opening 8, positioned at a suitable height above the opening 7 of the combustion chamber 6.

An exterior structure 9, having a suitable driven feed chain 10, hoists the trash from the ground and dumps it on a chute 11 which passes therefrom through the opening 8 in the outer shell 1 to the opening 7 in the dome of the combustion chamber 4. This exterior structure is of any desired design adapted to receive and hoist the trash and to deliver it to the center of the combustion chamber 4.

The outer shell 1 is preferably constructed of brick, while the inner wall 5 of the combustion chamber are constructed of suitable fire brick. The outer shell 1 is provided with an inner ring enlargement 12, adapted to contact the top of the wall 5 at the base of the dome 6 thereof so that the lower part of the outer wall 2 forms a brace for the said dome 6. This ring 12 is provided with a plurality of passages 13 (Figs. 1, 4) cut therethrough so as to connect the heat-insulating and cooling space 14, between the walls 2 and 5, with the gas-cooling space 15 above the dome 6 of the combustion chamber.

The forced draft for the combustion chamber is provided with a suitable power-driven blower or fan 16 which forces air into the combustion chamber 4 by way of the pipe 17. This pipe 17 passes through the base of both walls 2 and 5 at a tangent to the said chamber 4. This blast of air causes a cyclonic action on the trash being burned, tossing it about as it falls into the chamber from the chute 11 and blowing it around until it is entirely consumed. Additional air for combustion is admitted into the chamber 4 through a plurality of draft openings 18 (Figs. 1, 5) and this added air also travels around in the circular combustion chamber. The draft through these openings 18 is caused by two factors, namely first, the heated air in the chamber 4 is lighter than the air outside of the burner and tends to rise on a spiral course in the chamber and to form a partial vacuum therein; and second, the rapid circular motion of the air inside the chamber 4 tends to further lower the pressure therein and thus suck air into the chamber on the Venturi principle, and these two causes are cumulative and draw the fresh air into the chamber. The draft thus formed may be regulated by means of suitable vertically sliding doors 19 (Fig. 5) which may be adjusted in position as desired. The above described openings 18 form passages through the two walls 2 and 5 and are suitably disconnected from the space 14 between the said walls by means of bricks 20.

Similar larger clean-out passages 21 (Figs. 1, 6) also pass through the walls 2 and 5 and are closed by suitable doors 22. These passages also are disconnected from the cooling space 14 by suitable brick work 23 so that the passages 21 lead directly into the combustion chamber 4 and may be used for cleaning out the ash as occasion requires.

As before stated, the wall 5 of the combustion chamber is separated from the wall 2 of the outer shell 1 by a space 14. A plurality of air inlet passages 24 (Figs. 2, 3) pass through the outer wall 2 and are adapted to admit the outside air into the lower end of the space 14. This air then passes upward in the space 14 and escapes into the gas-cooling space 15 above the dome 6 by means of passages 13 formed in the ring 12 (Figs. 1, 4). Thus the space 14 not only acts as a heat insulator for the outer wall 2, but also keeps the said walls 2 and 5 cool by the flow of cool air therein, thereby tending to lengthen the life of the brickwork. Also this air passes up into the space 15, above the dome 6, and mixes with the hot gases of combustion coming from the combustion chamber 4 through the opening 7, thus cooling the said gases. This space 15 is of truncated conical form and of sufficient depth to permit a thorough mixing of the air with the hot gases of combustion.

A fire in the combustion chamber soon attains a very high temperature, being confined by the reflecting walls and dome, so that the wall 5 of the chamber may reach a point approaching the melting point of fire brick. This high temperature causes the wall 5 to expand. This expansion causes the top of the wall 5 to slide upward on the inner surface of the above-described ring 12 formed inside of the wall 2 and adapted to brace the dome 6 at every expanded position thereon.

Since the dome 6 has no keystone, in the ordinary sense of the word, it is necessary that the wall supporting it be very firm. By the above construction some of the outward thrust due to the weight of the dome, is taken up by the inclined wall 5 and the remainder thereof is transferred, through the sliding contact with the brace ring 12, to the outer wall 1, which has a wider base than the said wall 5. This thrust is, due to the form and proportions of the dome, inclined downward and outward and falls within the said base of the wall 1, thus eliminating the bending moment on the said walls which would be present if the said supporting walls 1 and 5 were not inclined inward.

If desired a series of metal bands 25 (Fig. 1) may encircle the outer surface of the inner wall 5 in order to reenforce the said wall.

Thus it will be seen that I have produced a trash burner of such form that, with a forced draft, a very high temperature is reached thereby burning all the trash fed thereto so completely that no cinders or sparks escape therefrom, and yet, in spite of this great inner heat, the walls are kept reasonably cool and the gases of combustion escaping therefrom are materially cooled.

It is, of course, understood that many changes may be made in the details of design of my improved trash burner without departing from the spirit of my invention as outlined in the appended claims.

Having, therefore, described my invention, what I claim and desire to secure by Letters Patent is:

1. In a trash burner, the combination of a circular inner combustion chamber composed of truncated conical walls supporting a dome, having a feed opening in the center thereof; an outer shell separated from and surrounding said combustion chamber; and a brace ring formed on the inside of the outer shell and having an upward sliding engagement with the upper end of the truncated wall of the combustion chamber to brace the base of the dome thereof, while permitting the upward expansion of said wall.

2. In a trash burner, the combination of a circular inner combustion chamber having a wall of truncated conical form, with a dome supported thereon; an outer shell having a wall separated from, surrounding, and parallel with the wall of the combustion chamber and forming a wall-cooling space between the shell and the combustion chamber wall, and extending far above the dome thereof to form a gas-cooling space within the shell and above the dome; a brace ring formed on the inside of the outer shell, and having an upward sliding engagement with the upper end of the truncated conical wall of the combustion chamber to brace the base of the dome thereof; air inlet passages through the lower end of the shell wall and connecting with the wall-cooling space between the shell and the combustion chamber wall and adapted to admit air into said space to cool the walls thereof; and air outlet passages through said brace ring and adapted to permit the egress of the air from said wall-cooling space and into the said gas-cooling space.

3. In a trash burner, the combination of a circular inner combustion chamber having a wall of truncated conical form, with a dome supported thereon; an outer shell having a wall separated from, surrounding, and parallel with the wall of the combustion chamber and forming a wall-cooling space between the shell and the truncated conical combustion chamber wall, and extending far above the dome thereof to form a gas-cooling space within the shell and above the dome; a brace ring formed on the inside of the outer shell and having an upward sliding engagement with the upper end of the truncated conical wall of the combustion chamber to brace the base of the dome thereof; power-driven means to supply a blast of air into the combustion chamber in a substantially tangential direction, whereby the fire is constantly and violently stirred; controlled draft passages through the walls of said shell and combustion chamber and adapted to admit additional air thereto, whereby the fire consumes all matter therein; air inlet passages through the lower end of the shell wall and connecting with the wall-cooling space between the shell and the combustion chamber and adapted to admit air into said space; and air outlet passages through said brace ring and adapted to permit the egress of the air from said wall-cooling space and into the said gas-cooling space.

FRED R. BOEDECKER.